(12) United States Patent
Poehlein et al.

(10) Patent No.: US 9,051,122 B2
(45) Date of Patent: Jun. 9, 2015

(54) IDLER ROLLER CONVEYOR SYSTEM

(71) Applicants: Raymond Edward Poehlein, Hammondsport, NY (US); Daniel Patrick Poehlein, Fairport, NY (US)

(72) Inventors: Raymond Edward Poehlein, Hammondsport, NY (US); Daniel Patrick Poehlein, Fairport, NY (US)

( * ) Notice: Subject to any disclaimer, the term of this patent is extended or adjusted under 35 U.S.C. 154(b) by 0 days.

(21) Appl. No.: 14/088,672

(22) Filed: Nov. 25, 2013

(65) Prior Publication Data

US 2014/0151182 A1   Jun. 5, 2014

Related U.S. Application Data

(60) Provisional application No. 61/731,539, filed on Nov. 30, 2012.

(51) Int. Cl.
  *B65G 13/12* (2006.01)
(52) U.S. Cl.
  CPC .................................... *B65G 13/12* (2013.01)
(58) Field of Classification Search
  USPC .................. 198/782, 806, 807; 193/35 R, 37
  See application file for complete search history.

(56) References Cited

U.S. PATENT DOCUMENTS

| | | | |
|---|---|---|---|
| 1,114,621 A | | 10/1914 | Lewis |
| 1,898,005 A | * | 2/1933 | Diescher ........................ 427/444 |
| 3,176,828 A | | 4/1965 | Sullivan |
| 3,905,472 A | | 9/1975 | Schuster |
| 4,111,412 A | * | 9/1978 | Cathers ........................... 271/251 |
| 4,270,879 A | * | 6/1981 | Kacirek ........................ 414/788.9 |
| 4,615,429 A | * | 10/1986 | Arase ............................. 198/456 |
| 5,653,325 A | | 8/1997 | Enomoto |
| 5,964,338 A | | 10/1999 | Schroader |
| 6,076,653 A | | 6/2000 | Bonnet |
| 6,253,905 B1 | * | 7/2001 | Pelka ............................. 198/456 |
| 7,383,935 B2 | * | 6/2008 | Tasma et al. ............. 198/370.01 |
| 7,854,314 B2 | * | 12/2010 | Pelak et al. ................... 198/572 |
| 8,196,736 B2 | * | 6/2012 | Wagner ....................... 198/781.1 |

* cited by examiner

Primary Examiner — Douglas Hess

(57) ABSTRACT

An idler roller conveyor uses paired rollers set at an acute angle to each other with the rollers being coplanar and skewed toward opposite sides of a perpendicular to a longitudinal axis of the conveyor. Roller pairs are preferably mounted in subframes that pivot about on an axis transverse to the conveyor's longitudinal axis. This arrangement produces opposing transverse forces that are subtractive to result in negligible resultant transverse forces that are unlikely to make an object veer off course.

13 Claims, 4 Drawing Sheets

Prior Art      Fig. 7

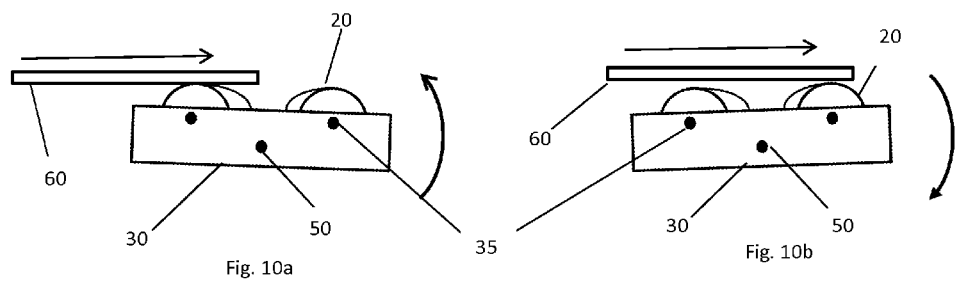
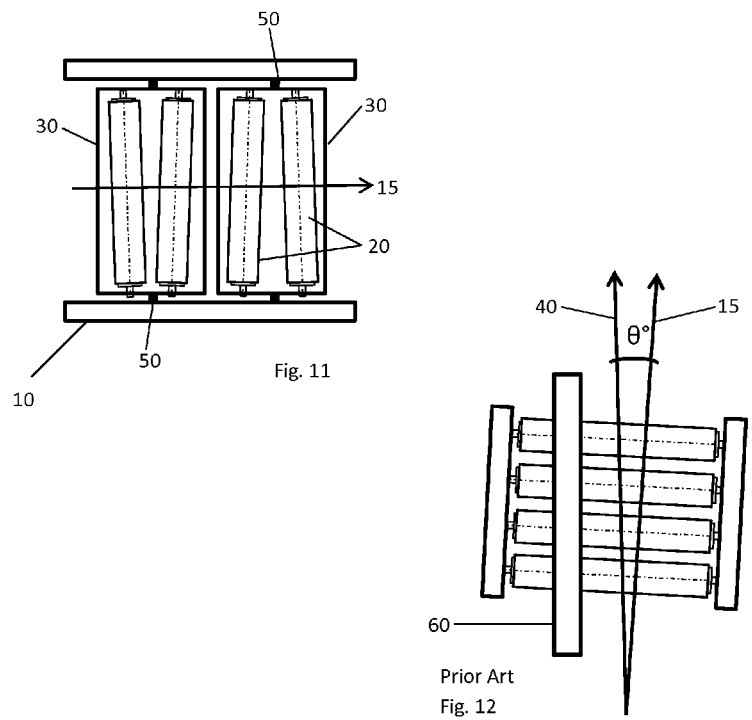

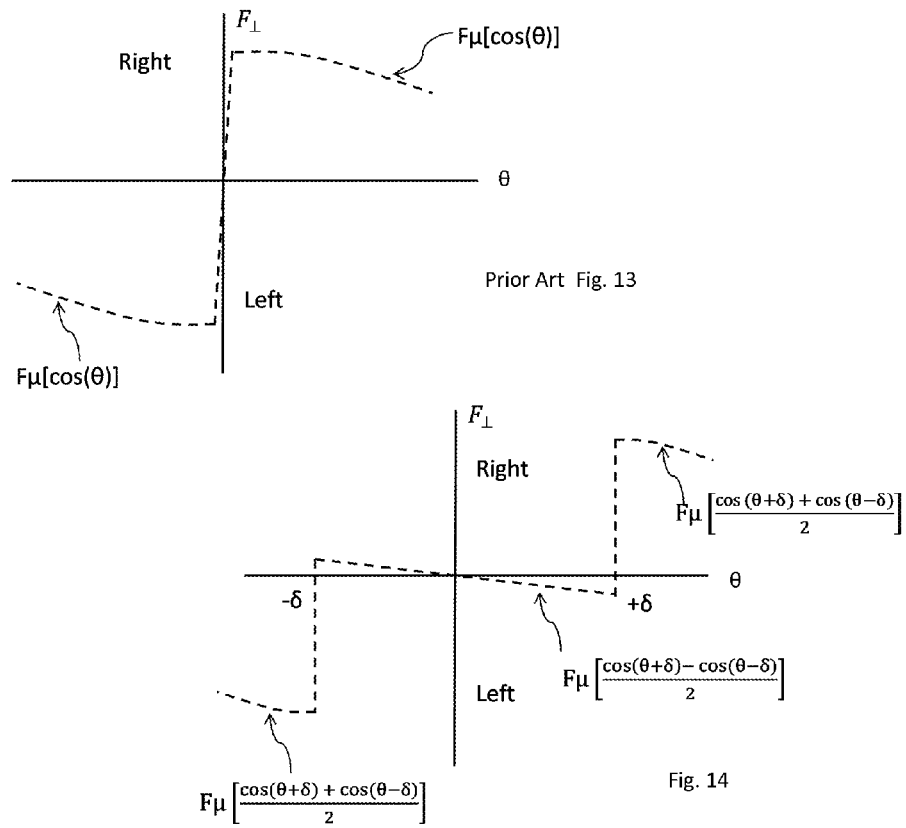

LEGEND:
$\delta$ – skew angle of rollers
F – Total normal force between object and rollers
$\mu$ - coefficient of friction between rollers and object
$\theta$ – Misalignment angle between the longitudinal axis of the conveyor and the intended direction of travel
$F_\perp$ - Resultant transverse force perpendicular to the intended direction of travel.

Fig. 15

IDLER ROLLER CONVEYOR SYSTEM

RELATED APPLICATIONS

This application relates to and replaces provisional patent application Ser. No. 61/731,539, filed on 30 Nov. 2012, entitled Improved Roller Conveyor System.

TECHNICAL FIELD

Idler roller conveyors

BACKGROUND

Idler roller conveyors are widely used to support the movement of objects to, through, or from workstations. In spite of extensive use for many different applications, idler roller conveyors can still cause serious problems. Many of these problems are caused by misalignment of conveyors with respect to workstations so that objects being moved over the rollers tend to move from their intended paths. These problems often occur from the way idler roller conveyors are manually set up relative to workstations. This is often done by eyeball positioning of a conveyor oriented in the intended direction of movement of an object.

Slight angular misalignments can easily occur as idler roller conveyors are manually set up. They can also be misaligned even when they are fixed in place by system design. The effects of minor misalignments of infeed or outfeed conveyors can cause surprisingly large and clearly undesirable forces (forces perpendicular to the intended conveyor path) which urge an object to veer away from its intended direction of travel. We aim to minimize such forces and the harm they cause.

An example of such a problematic system is an off-feed idler roller conveyor that supports boards as they are being fed through a table saw. Ideally, such boards should move parallel to and against a saw fence, but, it is difficult to precisely align existing roller conveyor systems accurately to a table saw fence, especially if the alignment is done manually. If not aligned accurately, the rollers will apply transverse forces to the board being moved through the saw. The transverse forces can greatly affect the system's functionality by urging the object away from its desired path. This can lead to poor quality cutting and operator safety problems. Many devices such as feather boards and spring loaded elastomer biasing wheels (Board Buddies) are available for table saws to help overcome such forces. These devices have to be very aggressive when used with existing roller conveyor systems due to the large forces they must counter.

We aim at greatly reducing forces that must be overcome by such devices, thus making their design simpler and less aggressive. Such reduction in these forces also makes it easier to move objects through a system with less chance for damage to materials or injury to people.

SUMMARY

Our proposed improvement in idler roller conveyors significantly reduces resultant transverse forces tending to make an object veer off course while being transported. This improvement is accomplished by arranging idler rollers in pairs mounted to have axes that are co-planar, non-parallel, acutely angled to each other, and skewed slightly toward opposite sides of a perpendicular to the longitudinal axis of the conveyor. The paired rollers use one roller to create a transverse force in one direction for an advancing object and produce an opposite direction force by the other paired roller. The opposing forces applied by the paired rollers are subtractive. This greatly reduces the resultant total transverse forces and significantly solves the problems created by parallel roller conveyors that are slightly misaligned with workstations.

To ensure optimum performance of our skewed roller conveyor system, the rollers of a roller pair are preferably mounted in a sub-frame that pivots slightly. The pivoting sub-frame extends across a path of movement of an object, and the axis of the pivoting sub-frame preferably is centered between the axes of the rollers in each idler roller pair. The pivoting action helps ensure that the weight of objects being transported is evenly distributed between each roller in a roller pair. This also helps ensure that the transverse forces produced by a roller pair are opposite and nearly equal.

The tilting sub-frame for paired rollers is arranged within a main conveyor frame. The axis of the pivoting frame is preferably perpendicular to a longitudinal axis of the conveyor. A single pair of rollers arranged in a pivoting frame can serve as an infeed or an outfeed support. In this case, the paired rollers are pivoted on an axis of a bisector of an angle between the rollers. Placing a pivot frame axis midway between the axes of an idler roller pair ensures that the object being transported experiences equal normal forces from the paired rollers. This arrangement leads to equal or nearly equal transverse forces that act subtractively in opposite directions.

A person setting up a conveyor having angled idler roller pairs tends to attempt attempts to align a longitudinal conveyor axis with the desired direction of feed. An eyeball adjustment can limit differences between the intended direction of travel and the longitudinal axis. To ensure that a person can get the desired reduction of resultant transverse forces, it only requires that the difference between the intended direction of travel and the longitudinal axis is limited to within plus/minus ½ the acute angle between the rollers in the roller pairs. In other words, if the rollers in the roller pairs are angled by 4° to each other, then the longitudinal axis can be misaligned from the intended direction of travel by up to, but not including 2° to the right and up to, but not including 2° to the left for a successful performance. The degree that the longitudinal axis can be misaligned with respect to the intended direction of travel is dependent on the acute angle between the idler rollers in the roller pairs. A larger acute angle between the idler rollers in the pairs of rollers allows for easier acceptable alignment for the user between the longitudinal axis and the intended direction of travel.

DRAWINGS

FIGS. 1-3 schematically illustrate a typical prior art idler roller conveyor construction as shown in FIG. 1. The transverse forces that can develop when an object is fed on such a conveyor, is shown in FIGS. 2 and 3.

FIG. 7 is a plan view of an idler roller such as used in prior art conveyors.

FIGS. 10A and 10B schematically illustrate how a support sub-frame can pivot to accommodate an advancing object.

FIG. 11 illustrates a conveyor frame in which two roller pair assemblies are mounted to pivot to apply transverse forces subtractively and equally on an object being moved.

FIG. 12 shows that a conventional idler roller conveyor angle Θ is derived from an intended direction of feed and a line perpendicular to the rollers.

FIG. 13 graphically illustrates unbalanced and significant transverse force from a parallel idler roller conveyor.

FIG. 14 graphically illustrates the significantly balanced and minimized transverse forces and from paired and angled idler rollers.

Figure 8:
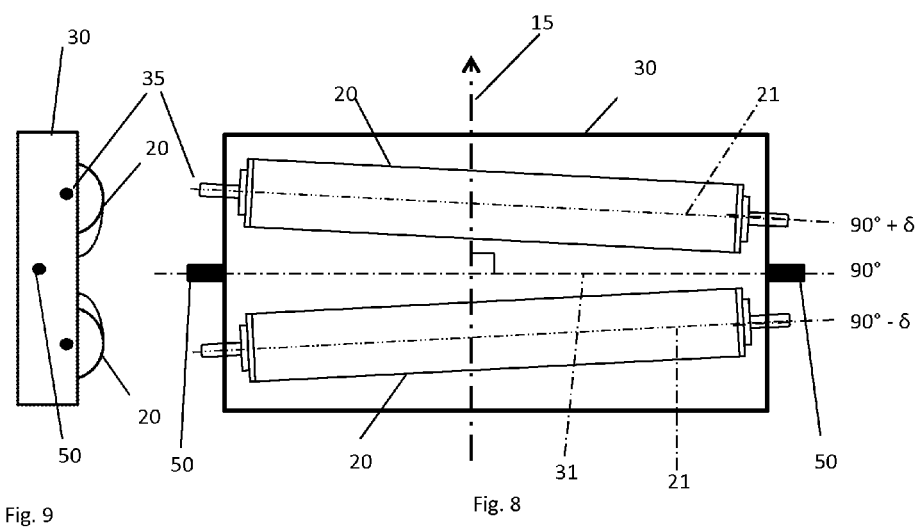

FIG. 15 is a legend defining the symbols used in FIGS. 13 and 14 and also applied to FIGS. 8 and 12.

DETAILED DESCRIPTION

Understanding the importance of our improvement in idler roller conveyors is significantly helped by understanding the forces involved, as follows:

NORMAL FORCE is the engagement force between supported objects and conveyor idler rollers. The line of action of the normal force is perpendicular to the roller surface, and the normal force is usually due to the weight of the object.

TANGENTIAL FORCE is the total force tangent to an idler roller surface. When the idler roller is misaligned with the direction of travel of the object, slippage between their surfaces will occur, and the tangential force will be equal to the normal force of engagement multiplied by the coefficient of friction between their surfaces. If the idler roller contains quality bearings (i.e. bearings that offer no resistance to roller rotation) the line of action of the tangential force will be parallel to the roller axis.

TRANSVERSE FORCE is that component of the tangential force perpendicular to the direction of object travel. The magnitude of the transverse force is the product of the tangential force and the cosine of the angle between a perpendicular to the intended direction of travel and the idler roller axis. For small angles the magnitude of the transverse force is essentially the same as the magnitude of the tangential force.

RESULTANT FORCE is a force that represents a combination of two or more forces.

Another term that is important to understand is LONGITUDINAL AXIS. The direction of the longitudinal axis for conveyors containing parallel idler rollers is perpendicular to the roller axes. The direction of the longitudinal axis for conveyors containing skewed roller pairs is perpendicular to a bisector of the angle between the skewed rollers. As illustrated in FIG. 12, the longitudinal axis 15 of a conveyor is often slightly misaligned with a workstation or an intended direction of travel 40 of an object. This produces an angle θ that results in generation of tangential and transverse forces.

Figure 1:
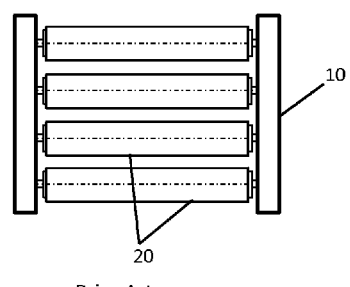
Figure 4:
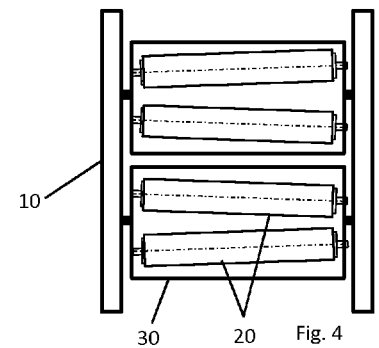
FIGS. 4-6 show angled pairs of idler rollers schematically illustrating opposed transverse forces that are subtractive.
Figure 2:
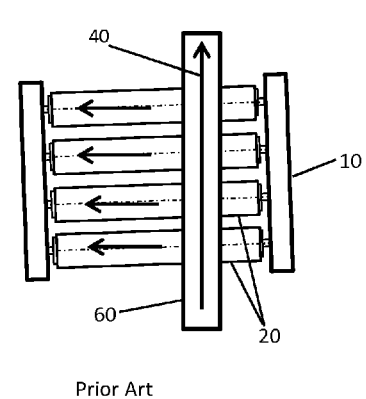
Figure 3:
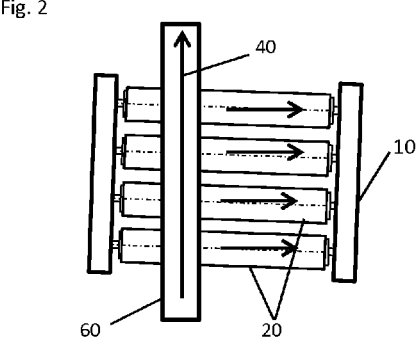

The drawings include some prior art conveyors and the problems they cause. This contrasts significantly with the conveyor improvements that solve these problems. For example, FIGS. 1-3 show a conventional idler roller conveyor with parallel rollers 20 mounted within a frame 10. FIGS. 2 and 3 illustrate the substantial transverse forces applied to an object 60 being moved whenever the conveyor is misaligned (even if this misalignment is slight) with an intended direction of travel 40 for the object 60. The transverse forces, as indicated by arrows on each roller, are nearly parallel with the roller axes and tend to move an object transversely of an intended direction of travel 40, as indicated by the arrow on the long and narrow object 60. Such transverse forces are often powerful enough to cause serious problems.

Figure 5:
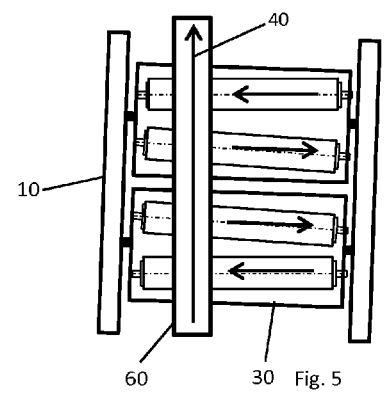
Figure 6:
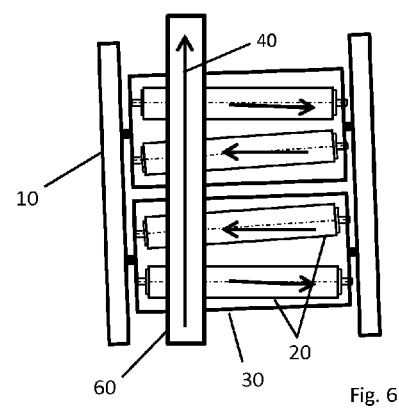
Figure 9:
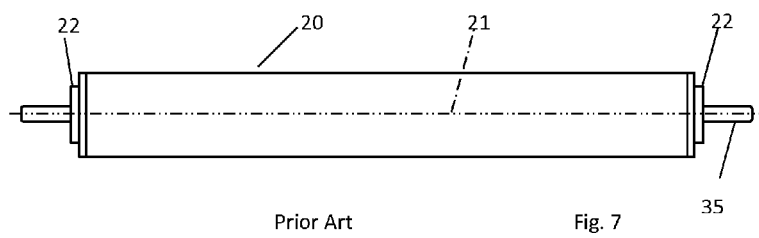
FIGS. 8 and 9 show an angled assembly of paired idler rollers arranged to counteract transverse forces.

In contrast to the problems illustrated in FIGS. 1-3, FIGS. 4-6 illustrate an improved idle roller conveyor using a conventional frame 10 and conventional idle rollers 20 arranged not parallel with each other but at acute angles to each other. A significant difference from the prior art is illustrated in FIGS. 5 and 6 where pairs of rollers are acutely angled to each other so that rollers of a pair produce opposite direction transverse forces between rollers 20 and an object 60. These transverse forces are indicated by arrows on each roller, and the force arrows show that transverse forces are subtractive and thus the resultant transverse force is minimized.

A conventional roller 20 as shown in FIG. 7 has an axis 21 and support bearings 22. Such rollers and bearings need not change to satisfy our improvement. What is changed, however, is the mounting of the rollers to minimize the resultant transverse forces in a roller pair by making the two transverse forces subtractive.

Acute angled roller pairs 20 are preferably mounted in sub-frames 30 as shown in FIGS. 8-11. As many sub-frames 30 as desired can be arranged to cross a longitudinal axis 15 of an improved conveyor. Each of the sub-frames 30 is pivotal on an axis 31 transverse to the longitudinal axis 15. This arrangement positions each roller in a roller pair in a common plane, in a non-parallel relationship, with the rollers 20 angled acutely from each other and ensures that the normal forces between the transported object and each roller of a roller pair are equal. The rollers are also skewed toward opposite sides of a perpendicular 31 to the longitudinal axis 15, as shown in FIG. 8. Pivots 50 of sub-frames 30 are arranged on a pivot axis that is also perpendicular to longitudinal axis 15. Pivot axis 31 also bisects the acute angle between axes 21 of a pair of rollers. This arrangement positions rollers 20 and their mounts 35 optimally to make transverse forces subtractive and therefore minimizes the resultant transverse force applied to a transported object by a roller pair.

A single pair of idler rollers 20 such as shown in FIG. 8 can be used as an infeed or outfeed stand in place of a single roller that is often used this way. These single idler rollers are problematic, because the roller has to be accurately oriented to be perpendicular to the direction of feed over the roller. Otherwise transverse forces can make feeding of objects in the desired direction difficult, move the object off the roller or tip over the stand. When a single angled roller pair is used, it is preferable to mount the rollers in sub-frame 30, as shown in FIGS. 8-11. Sub-frame 30 offers limited tilting range to a roller pair so that weight of an object 60 rests evenly on each roller.

It is also possible to arrange acutely angled rollers 20 within a conventional frame 10, without using pivoting sub-frames 30. This has the advantage of being simple and inexpensive, because it requires only relocating holes for roller support. Mounting the rollers within tilting sub-frames 30 better assures uniform normal forces between an object 60 and rollers 20 to most accurately have countering transverse forces that minimize their effect.

The improvement can be applied to idle roller conveyors of any length. In conveyor 10 in FIG. 11, two sub-frames 30 each holds a pair of rollers 20 to apply opposite direction transverse force to an object moving along the conveyor. Sub-frames 30 for each pair of rollers 20, are pivotally mounted within conveyor frame 10. This allows the roller assemblies within sub-frames 30 to pivot slightly, as shown by the arrows in FIGS. 10A and B. Rollers assembled within sub-frames 30 can have accurately predetermined skew angles δ to a perpendicular to the longitudinal axis. Such skew angles are usually well within 10° of a perpendicular to the longitudinal axis. The tilting of sub-frames 30 will be limited because they only need sufficient tilting capacity to evenly engage the load of an object 60. Limited tilting of the sub-frame will also ensure that objects being transported can smoothly move onto and off of the roller pairs.

The prior art presents at least two problems in misalignment of idler roller conveyors. One is that the conveyor, while oriented in an intended direction of feed, is often angled slightly from that intended direction. This occurs when idler roller conveyors are set up by eyeball to function with a workstation such as a table saw. The other problem is that even rollers that are fixed in place with respect to a workstation may not be accurately aligned with the desired path of travel. This is especially true if there are separate alignment adjustments in the workstation. A case in point is a table saw that has blade and fence adjustments.

An acute angle between idler roller pairs can be selected when a conveyor is built. To ensure that the selected acute angle between the roller pairs will be workable under the conditions to be met requires only that the acute angle between the roller pairs be large enough. Eyeball set ups to align a conveyor with a workstation can easily hold any discrepancy between the longitudinal axis of the conveyor and the direction of feed of the conveyor to within plus or minus ½ the acute angle of the roller pairs. The plus or minus is to allow for error on either the right or left side of the longitudinal axis. Another way of looking at this is that a bisector of the acute angle between the roller pairs is perpendicular to the longitudinal axis. This assures that when a conveyor is set up and approximately aligned with a workstation, the direction of feed will stay within the ½ angular limitation bounded by the acute angle. Error can occur up to slightly less of ½ the acute roller pair angle on either side of the longitudinal axis with the transverse forces being subtractive so that the conveyor feeds without a tendency to veer off course. Fortunately, the acute angle between the roller pairs can be as small as a few degrees and still reduce transverse forces resulting from typical eyeball misalignments.

Misalignment problems are particularly likely to occur with systems that contain a single roller outfeed or infeed conveyor. Such systems have short roller path lengths which make them more difficult to set in an accurately perpendicular orientation to the feed direction through a workstation. Our improved conveyor solves both of these problems in a simple and inexpensive way.

The mathematics of the idler roller conveyor operation are graphically illustrated for a prior art conveyor with parallel rollers in FIG. 13, and for an improved conveyor with pairs of angled rollers in FIG. 14. The legend of FIG. 15 defines the entities used in the mathematical description.

In FIG. 13, $\Theta$ is any angle that appears between the desired direction of movement and a longitudinal axis of a conveyor. Angle $\Theta$ is also illustrated in FIG. 12. The transverse force $F_\perp$ is affected by the normal force of engagement (F), the coefficient of friction between the object and the rollers ($\mu$), and these quantities serve as multipliers of a cosine value for the angle $\Theta$.

A prior art idler conveyor such as shown in FIGS. 1-3 can generate substantial transverse force, even when $\Theta$ angles are minute. For example, a 10 lb. board moves across a plurality of parallel rollers with an intended line of travel misaligned 1° to the total conveyor assembly. There is a 0.5 coefficient of friction.

$F_n$=10 lbs.
$\mu$=0.5
$\Theta$=1°

Plugging these values into a formula for parallel rollers $F\mu(\cos \Theta)$, we get $10 \times (0.5)(\cos 1°)$=4.99 lbs. of transverse force. This could lead to serious problems due to a tendency to cause an object to veer off its desired path of travel.

In contrast to the transverse force of 4.99 lbs. for a parallel idle roller conveyor, consider the much reduced transverse force obtainable with angled roller pairs deployed under the same assumptions. The graphic design of FIG. 14 applies to paired and angled rollers. The rollers as paired and angled on opposite sides of a perpendicular to the longitudinal axis by skew angles $\delta$ that result in opposite direction transverse forces. These skew angles are labeled plus (+) and minus (−) to show right and left generation of transverse force.

A 10 lb. board moves across an angled roller pair with an intended line of travel misaligned 1° to the longitudinal axis of the conveyor. There is a 0.5 coefficient of friction. The rollers skew angles $\delta$ are 2°. Plugging these values into a formula for angled pairs of roller:

$$F\mu \frac{[\cos(\Theta + \delta) - \cos(\Theta - \delta)]}{2},$$

we get $$10 \times (.5) \frac{[\cos(1° + 2°) - \cos(1° - 2°)]}{2} =$$

$$\frac{5x[.9986 - .9998]}{2} = .003 \text{ lbs. of force.}$$

The contrast between nearly 5 lbs. and 0.003 lbs. is quite surprising, but is mathematically verified. The paired and skewed rollers, with their production of oppositely canceling transverse forces results in a near perfect elimination of resultant transverse forces.

What is claimed is:

1. A conveyor system having a longitudinal axis oriented in an intended direction of travel of a transported object, and idler rollers being mounted to cross the longitudinal axis, the system comprising:
    the idler rollers including a pair of rollers having axes that are coplanar, non-parallel, acutely angled to each other, and are skewed toward opposite sides of a perpendicular of the longitudinal axis;
    the longitudinal axis being aligned with respect to the intended direction of travel to within +/−½ of the acute angle between the skewed rollers; and
    the skewing of the roller pair is arranged to reduce the resultant transverse forces on objects being fed along the conveyor system.

2. The system of claim 1 wherein the opposed skewing of the paired roller axes in roller pairs causes transverse forces between an object and each of the paired rollers to be subtractive to minimize resultant transverse forces acting upon the transported object.

3. The system of claim 1 wherein transverse forces on an object engaging the paired rollers urge the object in different directions which are subtractive.

4. The system of claim 1 wherein the pair of rollers are mounted to be pivotable on an axis transverse to the longitudinal axis.

5. The system of claim 1 wherein the resultant transverse forces ($F_\perp$) between the roller pairs and an object moving along the conveyor can be expressed:

$$F \perp = \frac{F\mu[\cos(\Theta + \delta) - \cos(\Theta - \delta)]}{2}$$

wherein
- $F_\perp$ is the total transverse force between the object and the roller pair;
- $\mu$ is the coefficient of friction between the surfaces of the rollers and the object;
- $\Theta$ is the misalignment angle between the conveyor's longitudinal axis and the intended feed transport direction; and
- $\delta$ is the skew angle between each roller of the roller pair and a perpendicular to the conveyor longitudinal axis.

6. A method of reducing resultant transverse forces occurring between idler rollers of a conveyor and an object moving along the conveyor in an intended direction, the method comprising:
- mounting a pair of the rollers to extend across the intended direction so that the rollers are coplanar, non-parallel, and are acutely angled relative to each other; and
- disposing axes of the paired rollers on opposite sides of a perpendicular to the intended direction so that the transverse force between the object and one of the paired rollers is directionally opposite to the transverse force between the object and another one of the paired rollers.

7. The method of claim 6 including mounting the roller pair so that a bisector of the acute angle between the rollers is approximately perpendicular to the intended direction.

8. The method of claim 6 including mounting the rollers in a pivotal sub-frame that extends across the intended direction and allows the roller pair to pivot evenly into engagement with the object.

9. The method of claim 6 including mounting the paired rollers in a frame oriented generally in the intended direction so that the paired rollers interact with the object to produce transverse forces in opposite directions.

10. The method of claim 6 wherein resultant transverse forces $F_\perp$ between the conveyor and an object moving along the conveyor are expressed as:

$$F \perp = \frac{F\mu[\cos(\Theta + \delta) - \cos(\Theta - \delta)]}{2}$$

wherein
- $F_\perp$ is the total transverse force between the object and the roller pair;
- $\mu$ is the coefficient of friction between the surfaces of the rollers and the object;
- $\Theta$ is the misalignment angle between the conveyor's longitudinal axis and the intended feed transport direction; and
- $\delta$ is the skew angle between each roller of the roller pair and a perpendicular to the conveyor longitudinal axis.

11. The method of claim 6 wherein any departure of the intended direction of travel from a longitudinal axis of the conveyor is limited to plus or minus ½ the acute angle between the skewed rollers.

12. In a conveyor having a frame with a longitudinal axis and mounting a plurality of idler rollers, the improvement comprising:
- the rollers being arranged in pairs having axes that are coplanar, non-parallel, and acutely angled from each other;
- the paired roller axes being deployed at skew angles $\delta$ on opposite sides of a perpendicular to the longitudinal axis;
- the rollers being arranged in a pivotal sub-frame that extends across the longitudinal axis and allows the roller pair to pivot evenly into engagement with the object;
- the conveyor being subject to resultant transverse forces ($F_\perp$) between the paired rollers and an object moving over the paired rollers, resulting in:

$$F \perp = \frac{F\mu[\cos(\Theta + \delta) - \cos(\Theta - \delta)]}{2}$$

wherein
- $F_\perp$ is the total transverse force between the object and the roller pair;
- $\mu$ is the coefficient of friction between the surfaces of the rollers and the object;
- $\Theta$ is the misalignment angle between the conveyor's longitudinal axis and the intended feed transport direction; and
- $\delta$ is the skew angle between each roller of the roller pair and a perpendicular to the conveyor longitudinal axis.

13. The improvement of claim 12 wherein any misalignment between the intended direction of travel and the longitudinal axis is held within plus or minus ½ the acute angle between the skewed rollers.

* * * * *